R. L. BATE.
Coffee-Pot.
No. 163,351. Patented May 18, 1875.
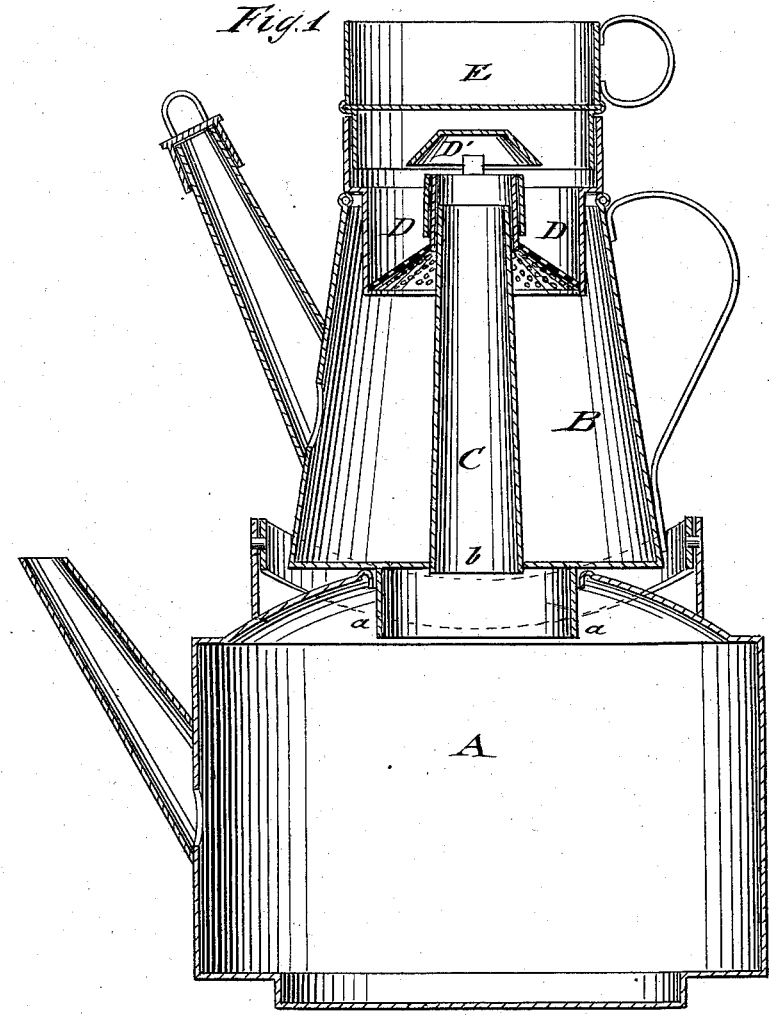
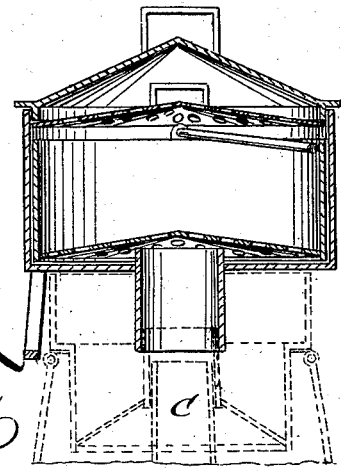
WITNESSES:
E. Wolff
A. J. Terry
INVENTOR:
R. L. Bate
BY
Munn & Co.
ATTORNEYS.

UNITED STATES PATENT OFFICE.

RICHARD LAW BATE, OF ADRIAN, MICHIGAN.

IMPROVEMENT IN COFFEE-POTS.

Specification forming part of Letters Patent No. 163,351, dated May 18, 1875; application filed April 3, 1875.

*To all whom it may concern:*

Be it known that I, RICHARD L. BATE, of Adrian, Lenawee county, Michigan, have invented a new and useful Improvement in Combined Coffee-Pot and Kettle, of which the following is a specification:

The accompanying drawing represents a sectional elevation of my improved coffee-pot applied to a kettle in the position required for practical operation.

My invention is an improvement in the class of coffee-pots having a central steam-conducting tube. The improvement consists in the construction and arrangement of parts, as hereinafter described and claimed.

In the drawing, A represents a kettle; B, the coffee-pot, which is seated by a bottom extension, a, in an open top of the same. A central tube, C, extends vertically from a bottom aperture, b, within the seat a, to about the height of the coffee-pot, and is provided with a detachable strainer, D, having a perforated bottom for the ground coffee, and being snugly fitted to the upper end of tube C, and to the rim of pot B. A detachable cap, C', is attached to the central tube of the strainer, and serves to throw the steam on the ground coffee. A vessel, E, with cold water is placed on the top of the strainer for condensing the steam passing from the kettle through the tube to the strainer. The condensed steam drops on the coffee, and passes through the perforated bottom of the strainer into the body of the pot below the same.

The coffee is thus cooked in a few minutes after the water in the kettle has commenced boiling, and may be continued till all the flavor is extracted.

I do not claim, broadly, the combination of a condensing cup or vessel with a coffee-pot having a vertical steam-tube; but

Having thus described my invention, I claim as new and desire to secure by Letters Patent—

The improved coffee-pot, formed of the body portion B, having the base-flange a, and central open-ended steam-tube C, with deflector D', the detachable strainer D, with conical perforated bottom and short central tube, and the detachable cup or vessel E, having a bottom flange for adapting it to connect with the strainer, all as shown and described.

RICHARD LAW BATE.

Witnesses:
FRANKLIN BETTS KEITH,
FRANKLIN B. NIXON.